United States Patent [19]

Durbin

[11] Patent Number: 5,174,059
[45] Date of Patent: Dec. 29, 1992

[54] CRAB TRAP APPARATUS

[76] Inventor: Anthony L. Durbin, P.O. Box 64, Columbia City, Oreg. 97018

[21] Appl. No.: 881,164

[22] Filed: May 11, 1992

[51] Int. Cl.[5] ............................................. A01K 69/00
[52] U.S. Cl. ....................................... 43/100; 43/44.99
[58] Field of Search ................. 43/100, 102, 103, 104, 43/105, 42.06, 44.99, 54.1, 41

[56] References Cited

U.S. PATENT DOCUMENTS

| | | | |
|---|---|---|---|
| 2,713,744 | 7/1955 | Strausser, Sr. | 43/44.99 |
| 2,984,208 | 5/1961 | Kopietz | 43/44.99 |
| 3,916,558 | 11/1975 | Crouch | 43/100 |
| 4,216,607 | 8/1980 | Lyster | 43/100 |
| 4,447,978 | 5/1984 | Robison | 43/102 |
| 4,697,381 | 10/1987 | Esgro et al. | 43/100 |
| 4,829,705 | 5/1989 | Dorsey | 43/44.99 |

Primary Examiner—Richard K. Seidel
Assistant Examiner—Chuck Y. Mah
Attorney, Agent, or Firm—Leon Gilden

[57] ABSTRACT

A crab trap includes a central toroidal base ring having upper and lower cages mounted to upper and lower surfaces of the base ring, with the upper and lower cages coaxially aligned relative to the axis of the base ring. The base ring includes a plurality of snare rings mounted peripherally about the base ring. A modification of the invention includes a scent delivery system to direct crab attracting scent from the cages.

7 Claims, 5 Drawing Sheets

CRAB TRAP APPARATUS

BACKGROUND OF THE INVENTION

1. Field of the Invention

The field of invention relates to crab trap apparatus, and more particularly pertains to a new and improved crab trap apparatus wherein the same is arranged to effect snaring of crab members relative to a central bait cage.

2. Description of the Prior Art

Crab traps of various types have been utilized throughout the prior art and are typically of a one-way trap structure such as set forth in U.S. Pat. No. 4,554,760; 4,887,382; and the U.S. Pat. No. 4,697,381 to Esgro, et al. setting for a linear crab trap employing snare rings.

As such, it may be appreciated that there continues to be a need for a new and improved crab trap apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of crab trap apparatus now present in the prior art, the present invention provides a crab trap apparatus wherein the same employs a scent dispensing central bait cage relative to peripherally mounted snare rings. As such, the general purpose of the present invention, which will be described subsequently in greater detail, is to provide a new and improved crab trap apparatus which has all the advantages of the prior art crab trap apparatus and none of the disadvantages.

To attain this, the present invention provides a crab trap including a central torroidal base ring having upper and lower cages mounted to upper and lower surfaces of the base ring, with the upper and lower cages coaxially aligned relative to the axis of the base ring. The base ring includes a plurality of snare rings mounted peripherally about the base ring. A modification of the invention includes a scent delivery system to direct crab attracting scent from the cages.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure in based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved crab trap apparatus which has all the advantages of the prior art crab trap apparatus and none of the disadvantages.

It is another object of the present invention to provide a new and improved crab trap apparatus which may be easily and efficiently manufactured and marketed.

It is a further object of the present invention to provide a new and improved crab trap apparatus which is of a durable and reliable construction.

An even further object of the present invention is to provide a new and improved crab trap apparatus which is susceptible of a low cost of manufacture with regard to both materials and labor, and which accordingly is then susceptible of low prices of sale to the consuming public, thereby making such crab trap apparatus economically available to the buying public.

Still yet another object of the present invention is to provide a new and improved crab trap apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
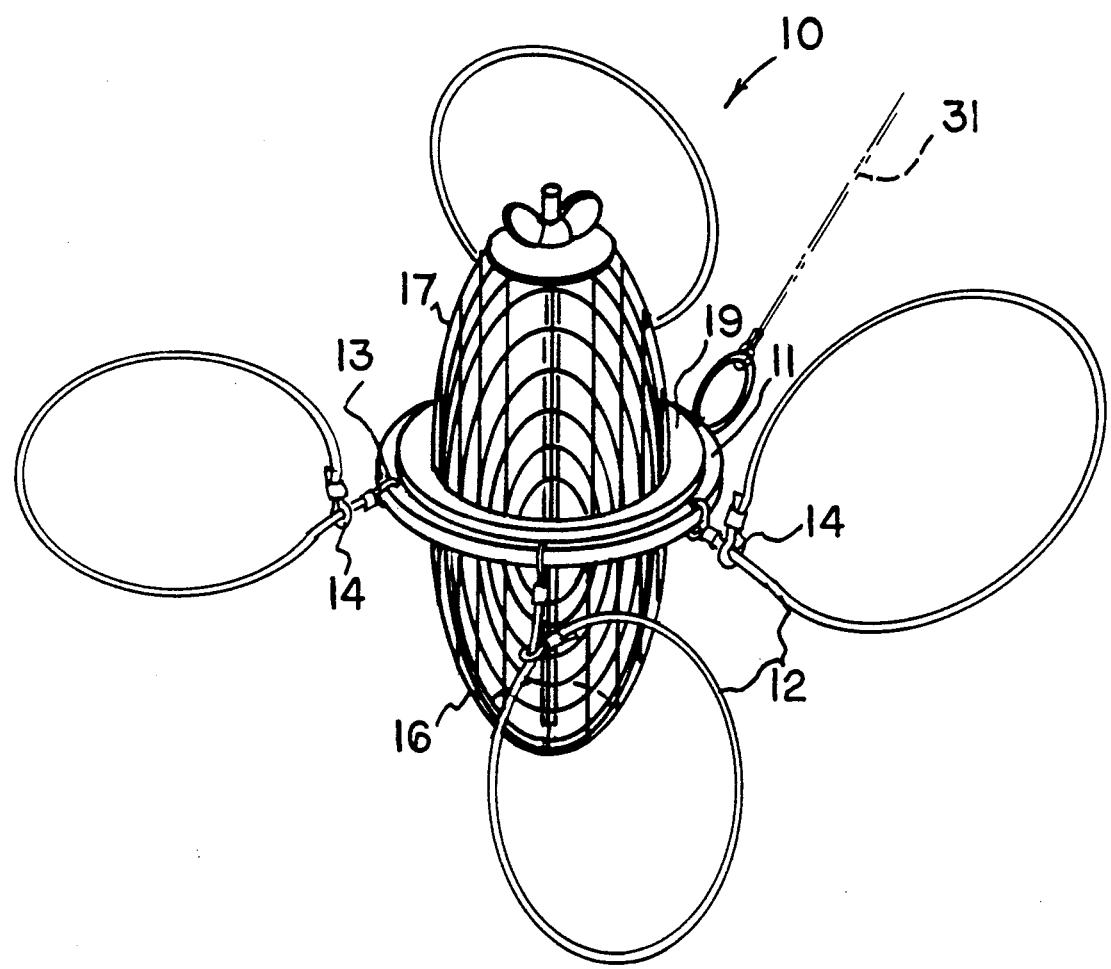
FIG. 1 is an isometric illustration of the instant invention.
Figure 2:
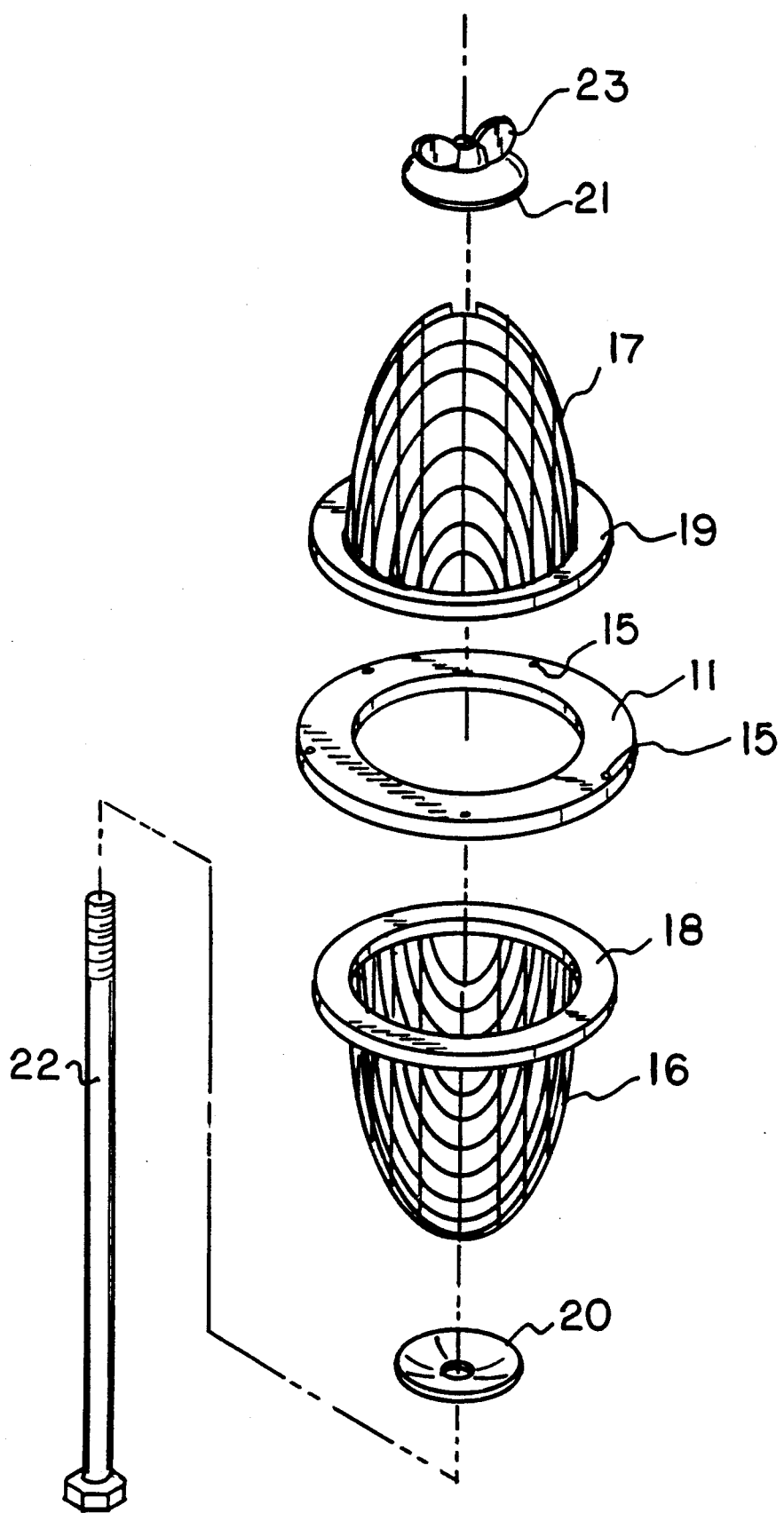
FIG. 2 is an isometric exploded view of the instant invention.
Figure 3:
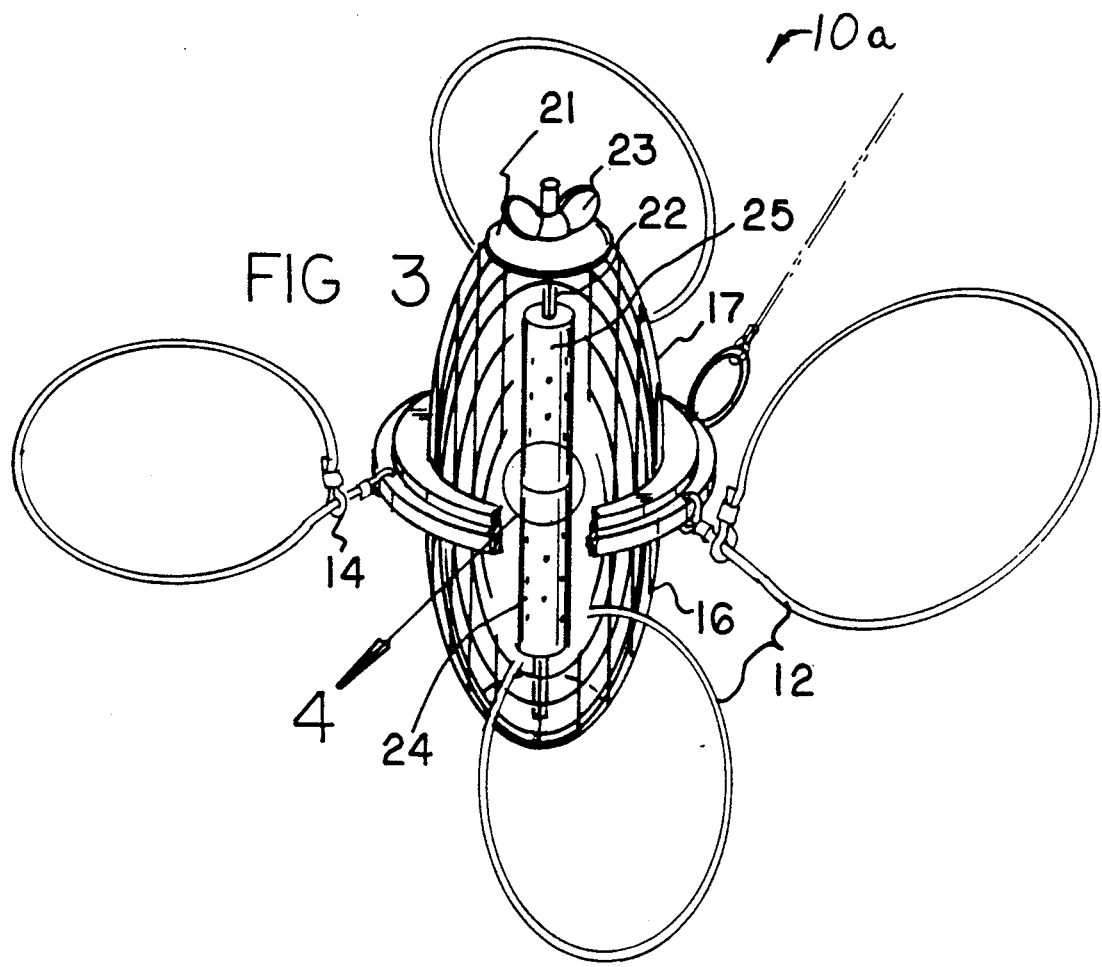
FIG. 3 is an isometric illustration of the invention illustrating the scent dispensing reservoir mounted centrally thereof.
Figure 4:
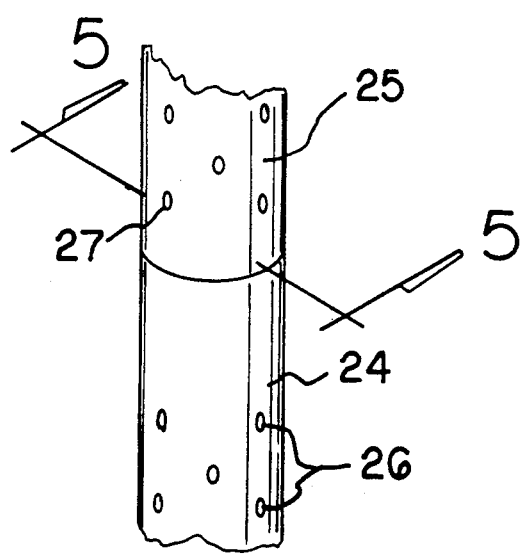
FIG. 4 is an isometric illustration of section four set forth in FIG. 3.
Figure 5:
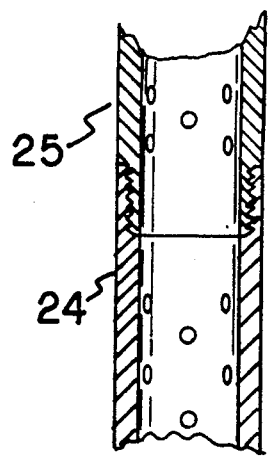
FIG. 5 is an orthographic view, taken along the lines 5—5 of FIG. 4 in the direction indicated by the arrows.

With reference now to the drawings, and in particular to FIGS. 1 to 7 thereof, a new and improved crab trap apparatus embodying the principles and concepts of the present invention and generally designated by the reference numeral 10 will be described.

More specifically, the crab trap apparatus 10 of the instant invention essentially comprises a toroidal base ring 11, including a planar top surface and a planar bottom surface arranged in a parallel spaced relationship having a plurality of snare cable loops 12 mounted peripherally thereabout. Each cable loop 12 includes a cable first end loop 13 pivotally mounted to a periphery of the base ring 11, with a cable second end loop 14 receiving the cable therethrough in a slidable relationship to provide for a snare loop 12 that is self-closing upon lifting of the apparatus by a support cable 31 mounted to the base ring 11. The first end loops 13 are received through base ring apertures 15 (see FIG. 2) to slidably receive the first end loops 13 therethrough.

A first cage half 16 is mounted to a bottom surface of the base ring 11, with a second cage half 17 mounted to the top surface of the base ring 11, as the first and second cage halves 16 and 17 are coaxially aligned about an axis of the base ring 11. The first cage half 16 is mounted to a first cage support ring 18, with the second cage half 17 mounted to a second cage support ring 19 to provide planar engagement with respective bottom and top surfaces of the base ring 11 in the securement of the cage halves relative to the base ring. A first cage washer 20 is mounted coaxially and medially of the outer surface of the first cage half 16, with a second cage washer 21 mounted medially to an outer surface of the second cage half 17, to include a cage clamp rod 22 coaxially aligned relative to the axis of the base ring 11 directed through the first and second cage halves 16 and 17 having a fastener 23 mounted to a distal end of the clamp rod 22 as an enlarged head portion mounted exteriorly of the first cage washer 20 permits clamping of the first and second cage halves together permitting positioning of various bait in the cage structure for attracting of crabs thereto.

The apparatus 10a, as illustrated in the FIGS. 3-6, includes a lower reservoir shell 24 threadedly receiving an upper reservoir shell 25 to secure the upper and lower reservoir shells together, with the first and second reservoir shells having the clamp rod 22 coaxially directed therethrough. The lower and upper reservoir shells include respective lower and upper shell apertures 26 and 27 permitting selective and metered escape of various crab attractant fluids directed from the reservoir structure.

Figure 6:
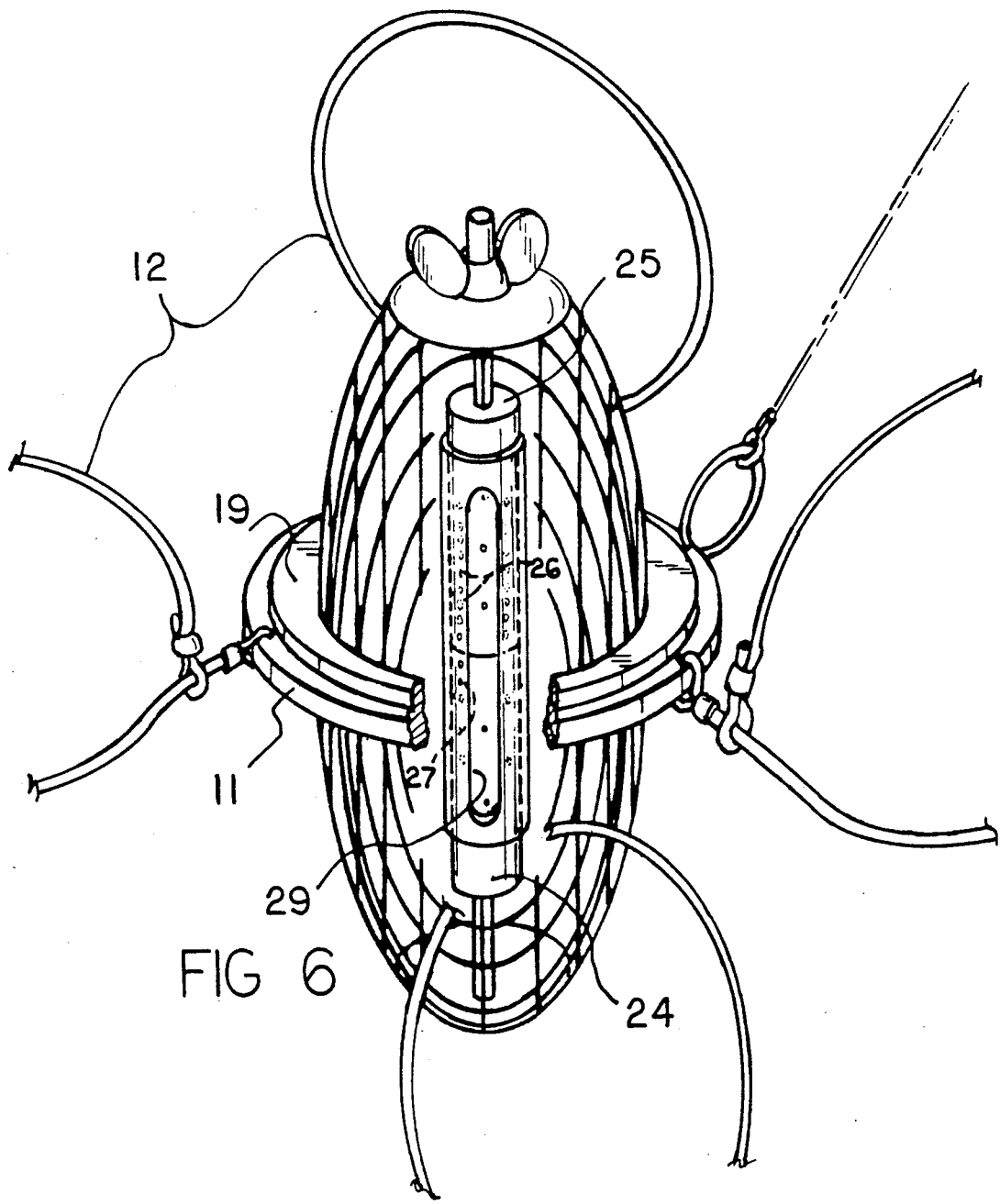
FIG. 6 is an isometric illustration of the invention, partially in section, illustrating the use of a scent controlling shell mounted about the reservoir.

The FIG. 6 illustrates the further use of a tubular sleeve 28 having a sleeve window 29 directed through the sleeve, wherein the tubular sleeve 28 is slidably received about the exterior surface of the lower and upper reservoir shells 24 and 25 to further limit flow of a crab attractant fluid escaping therefrom to permit further metering of fluid. In this manner, the lower and upper shell apertures 26 and 27 are formed of various densities throughout and about the surface of the lower and upper reservoir shells to permit positioning of the window 29 selectively about such varying apertures density if so desired. It should be noted that FIG. 6 illustrates a greater aperture density adjacent the window 29, whereupon displacement of the window 29 rotatably about the lower and upper reservoir shells permits positioning of the greater density apertures 26 and 27 into operative communication with the window structure 29. It should be noted that aperture density may be considered as greater apertures per square inch in positioning of greater apertures per square inch about certain portions of the reservoir shells rather than other portions to permit positioning of such greater density apertures in operative communication through the window 29.

Figure 7:
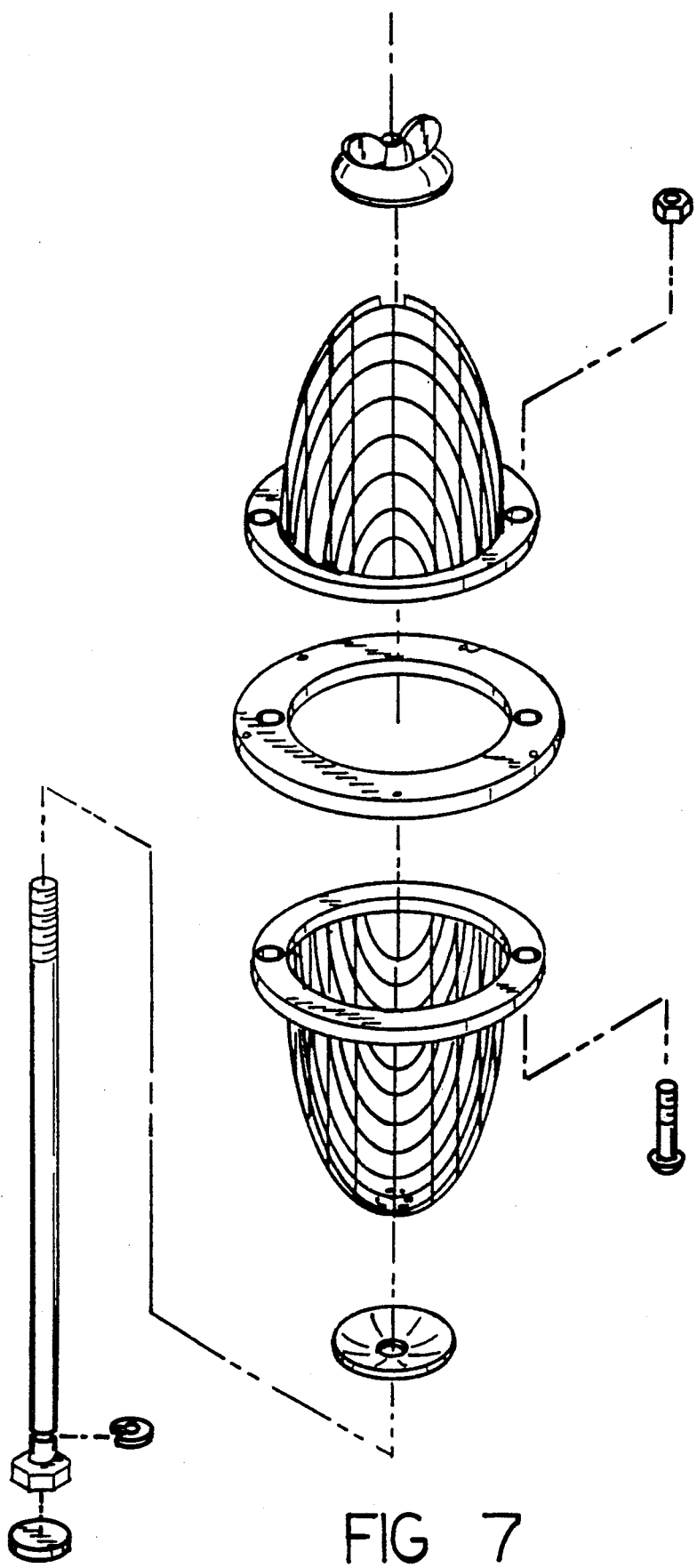
FIG. 7 is an exploded isometric illustration of a fastening structure in association with the crab trap structure of the invention.

FIG. 7 indicates the organization to further employ and be constructed with a plurality of clamp apertures 15a directed into the base ring 11 at diametrically opposed positioned therethrough in an orthogonal relationship. The clamp apertures 15a are internally threaded. The first cage support ring 18 and the second cage support ring 19 have respective first and second ring apertures 18a and 19a to cooperate with fastener bolts 41 that are directed through the first and second support rings 18 and 19 cooperating with fastener bolts 41. The advantage of such construction is that in the event of loss of the fastener nuts as an assist in the further carrying of the cage support rings together, the bolts may be directed in opposed orientations relative to one another to provide for securement of the oganization together where typically, repair of such devices is inconvenient or impossible in at sea repair. It should be further noted that the clamp rod 22 is formed with an annular groove 22a to receive a clip member 42 to capture and position the clamp rod relative to the first cage half 16. For additional convenience, a zinc plate 43 is fixedly adhered to a bottom surface of the clamp rod 22 to counter and provide for a destructive component in typical electrolysis occurring in an at sea utilization of the device.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A crab trap apparatus, comprising,
  a toroidal base ring, the base ring having an outer periphery,
  and
  a central bore directed therethrough, with the central bore coaxially directed through the base ring, with the base ring defined about a central axis,
  and a plurality of cable loops mounted peripherally to the base ring extending exteriorly thereof, wherein each of the cable loops includes a first end loop pivotally mounted to the base ring, and a second end loop slidably receiving one of said cable loops therethrough,
and
a top surface spaced from and parallel a bottom surface,
and
a first cage mounted to the bottom surface, and a second cage mounted to the top surface,
and
the first cage is mounted to a first cage support ring, the first cage support ring mounted to the bottom surface, the second cage mounted to a second cage support ring, the second cage support mounted to the top surface, and a cage clamp rod coaxially aligned with the axis and directed medially through the first cage and the second cage securing the first cage and the second cage together.

2. An apparatus as set forth in claim 1 wherein the cage clamp rod includes a head member mounted exteriorly of the first cage, and a clamp fastener mounted exteriorly of the second cage to secure the second cage and the first cage together.

3. An apparatus as set forth in claim 2 including a lower reservoir shell threadedly receiving an upper reservoir shell, with the lower reservoir shell and the upper reservoir shell formed of a cylindrical configuration, with the clamp rod coaxially directed through the lower reservoir shell and the upper reservoir shell.

4. An apparatus as set forth in claim 3 wherein the lower reservoir shell includes a matrix of lower shell apertures directed therethrough, the upper reservoir shell includes a matrix of upper shell apertures directed therethrough permitting metered fluid flow of a scented fluid contained within the lower reservoir shell and the upper reservoir shell.

5. An apparatus as set forth in claim 4 including a tubular sleeve slidably and rotatably mounted about the lower reservoir shell and the upper reservoir shell receiving the upper reservoir shell and the lower reservoir shell therewithin, the tubular sleeve including an elongate window, the window extending along the lower reservoir shell and the upper reservoir shell permitting selective covering of a plurality of said lower shell apertures and upper shell apertures.

6. An apparatus as set forth in claim 5 including a zinc plate fixedly mounted to the head member of the cage clamp rod.

7. An apparatus as set forth in claim 6 wherein the first cage support ring and the second cage support ring each includes coaxially aligned respective first and second ring apertures, and wherein the base ring includes base ring apertures coaxially aligned with the first and second ring apertures, and wherein the base ring apertures are internally threaded, and externally threaded fastener means directed through the first and second ring apertures and threadedly received within the base ring apertures for securing the first cage to the second cage.

* * * * *